United States Patent [19]

Hoch

[11] Patent Number: 5,527,842

[45] Date of Patent: Jun. 18, 1996

[54] ALKYL-THIO-GLYCOLATE PVC STABILIZERS WITH ADDED AROMATIC ETHER ALCOHOL TO PREVENT PRECIPITATION

[75] Inventor: Samuel Hoch, Brooklyn, N.Y.

[73] Assignee: Witco Corporation, Greenwich, Conn.

[21] Appl. No.: 401,784

[22] Filed: Mar. 10, 1995

[51] Int. Cl.$^6$ ................ C08K 5/58; C08K 5/57
[52] U.S. Cl. ............... 524/180; 252/400.1; 252/407; 524/181; 524/182
[58] Field of Search ............... 524/375, 180, 524/181, 182; 252/400.1, 407

[56] References Cited

U.S. PATENT DOCUMENTS

| | | | |
|---|---|---|---|
| 3,405,085 | 10/1968 | Girg et al. | 524/375 |
| 3,502,616 | 3/1970 | Stapfer | 524/181 |
| 3,766,106 | 10/1973 | Yurimoto et al. | 524/375 |
| 3,856,547 | 12/1974 | Aron | 524/375 |
| 4,042,549 | 8/1977 | Ahr et al. | 252/407 |
| 4,059,562 | 11/1977 | Hoch et al. | 524/180 |
| 4,141,870 | 2/1979 | Burns | 524/375 |
| 5,032,634 | 7/1991 | Walter | 524/181 |
| 5,041,485 | 8/1991 | Eichenauer et al. | 524/285 |
| 5,078,892 | 1/1992 | Beekman et al. | 252/400.1 |

FOREIGN PATENT DOCUMENTS

| | | |
|---|---|---|
| 45-9160 | 4/1970 | Japan . |
| 56-61448 | 5/1981 | Japan . |
| 57-67664 | 4/1982 | Japan . |
| 54-66257 | 3/1989 | Japan . |

Primary Examiner—Veronica P. Hoke
Attorney, Agent, or Firm—Scully, Scott, Murphy & Presser

[57] ABSTRACT

Disclosed are liquid stabilizer compositions useful in polyvinyl chloride formulations and which exhibit a reduced tendency to form precipitates on standing, comprising one or more aromatic ether alcohols of the formula (1)

$$\text{Ar}-\text{O}-(\text{CH}_2\text{CH}(\text{X})\text{O})_n\text{H} \quad (1)$$

wherein Ar is aryl, X is —H or —CH$_3$, and n is 1 to 5, and one or more thioglycolates of the formula (2)

$$(\text{R}^1)_a\text{Sn}(-\text{SCH}_2\text{COOR}^2)_{4-a} \quad (2)$$

wherein R$^1$ is C$_{1-4}$ alkyl, a is 1–2, and R$^2$ is C$_{7-16}$ alkyl.

30 Claims, No Drawings

ALKYL-THIO-GLYCOLATE PVC STABILIZERS WITH ADDED AROMATIC ETHER ALCOHOL TO PREVENT PRECIPITATION

BACKGROUND OF THE INVENTION

The present invention relates to liquid stabilizer systems for vinyl halide resin compositions, to resinous compositions stabilized therewith, and to methods of preparation of such products. More particularly, it relates to liquid stabilizer systems including a tin-organo sulfur compound and an additive therefor.

It is well known that vinyl halide resins undergo undesirable changes when they are exposed to heat or to light, and that these changes lead to discoloration and to deterioration of the mechanical properties of compositions containing such resins. Since elevated temperatures are required for the processing and/or formulation of compositions containing these resins, and since the resins are exposed to heat, to light, or both, when they are subsequently used, it is necessary to incorporate in the vinyl halide compositions stabilizers that will inhibit or prevent discoloration, or loss of physical integrity, when they are exposed to such conditions.

Organo tin compounds that contain sulfur have long been recognized as highly effective heat stabilizers for vinyl halide resin compositions. Examples include organo tin ethanol mercaptides such as those disclosed in U.S. Pat. No. 4,059,562; and monomeric tetra-functional organotin mono- or di-alkyl di- or tri- (alkyl thioglycolate) or (mercapto alkyl carboxylate) compounds such as disclosed in U.S. Pat. No. 5,032,634.

A thorough historical review of organotin and organotin-sulfur compounds in stabilizing polyvinyl chloride compositions appears in the "Plastics Additives and Modifiers Handbook" (J. Edenbaum, Van Nostrand Reinhold, 1992, at pp. 309–326, Chapter 19: Dworkin, "Polyvinyl chloride processing stabilizers: tin and its derivatives".

Compounds of the formula (2)

$$(R^1)_a Sn(-SCH_2COOR^2)_{4-a} \quad (2)$$

wherein the substituents $R^1$ and $R^2$ and the subscript a are as defined herein, are useful liquid stabilizers for vinyl halide resins, but have long been known to exhibit a tendency to form precipitates on standing. The precipitates generally have a higher tin content than the liquid product, but are considerably less effective as stabilizers. Thus, the formation of the precipitates represents an undesirable economic loss, in the stabilization efficiency which is lost, in the cost of the product which is lost to the precipiatate, as well as in the input of material and energy necessary to attempt to redissolve or otherwise handle the precipitates. There thus remains a need to formulate liquid stabilizers for vinyl halide compositions, including one or more components of the above mentioned formula (2), which do not exhibit a tendency to form precipitates and yet which otherwise can be formulated effectively into vinyl halide resin compositions.

BRIEF SUMMARY OF THE INVENTION

One aspect of the present invention is a liquid stabilizer composition for poly(vinyl halide) compositions which exhibits a reduced tendency to form precipitate on standing, comprising (a) an aromatic ether alcohol of formula (1)

$$Ar-O-(CH_2CH(X)O)_n H \quad (1)$$

wherein Ar is aryl containing 6 to 10 carbon atoms;
X is —H or —CH$_3$; and
n is 1 to 5; and (b) one or more thioglycolates of formula (2)

$$(R^1)_a Sn(-SCH_2COOR^2)_{4-a} \quad (2)$$

wherein $R^1$ independently at each occurrence is straight or branched alkyl containing 1 to 4 carbon atoms;
a is 1 to 2;
$R^2$ independently at each occurrence is straight or branched alkyl containing 7 to 16 carbon atoms; optionally admixed with one or more tin compounds selected from the group consisting of monoalkyl tin sulfides, dialkyl tin sulfides, monoalkyl tin carboxylates, and dialkyl tin carboxylates, in which group each alkyl substituent independently is straight or branched and contains 1 to 4 carbon atoms.

The components (a) and (b) are present in such amounts relative to each other that the composition containing those components is a liquid which is stable against formation of precipitates on standing, even prolonged standing.

Another aspect of the present invention is vinyl halide resin compositions containing such a stabilizer composition in an amount thereof effective to impart to the vinyl halide resin increased stability against heat-mediated degradation of the polymer composition.

Another aspect of the present invention is the method of prolonging the stability against precipitate formation of a liquid stabilizer composition which comprises one or more thioglycolates of the foregoing formula (2), comprising admixing into said composition one or more compounds of the foregoing formula (1) in an amount thereof effective to prolong the stability against precipitate formation of said admixture.

DETAILED DESCRIPTION OF THE INVENTION

One of the essential components of the liquid stabilizer compositions of the present invention is one or more compounds corresponding to formula (2), which compounds are generally termed thioglycolates. While the advantages of the present invention can be realized in compositions containing but one compound corresponding to formula (2), the advantages are quite evident in compositions containing more than one thioglycolate of the formula (2) in the stabilizer composition.

Referring to formula (2), the group $R^1$ is straight or branched alkyl containing 1 to 4 carbon atoms. $R^1$ is preferably methyl or n-butyl. The group $R^2$ is straight or branched alkyl containing 7 to 16 carbon atoms, and preferably straight or branched alkyl containing 8 to 10 carbon atoms. Particularly preferred $R^2$ groups include ethylhexyl such as 2-ethylhexyl, and more generally isooctyl.

In formula (2), a is 1 or 2. However, compounds wherein a is 1 and compounds wherein a is 2 are believed to have somewhat different effects on polymer compositions into which they are compounded; that is, compounds wherein a is 1 are believed to improve early color stability but to exhibit shorter longer-term stability, whereas compounds wherein a is 2 conversely exhibit better longer-term stability. Thus, it is preferred to use stabilizers which contain blends of two or more thioglycolates of the formula (2), such that the average value of a, the number of alkyl (preferably methyl) substituents, is between 1 and 2, corresponding to about 19:1 to 1:19 by weight. As will be pointed out below, the blends are advantageously prepared by suitable adjustment of the e.g. alkyl tin chloride and thioglycolate reactants.

The liquid stabilizer compositions can, and preferably do, contain one or more alkyl tin sulfides, particularly monoalkyl tin sulfide, dialkyl tin sulfide, or both, and can contain one or more monoalkyl tin carboxylates alone or with any mono-or dialkyl tin sulfide. The alkyl moiety can be straight or branched and contains 1 to 4 carbon atoms. Preferably the alkyl moiety is methyl, or n-butyl. More preferably, the liquid stabilizer composition contains both monoalkyl tin sulfide and dialkyl tin sulfide.

The monoalkyl tin sulfide, dialkyl tin sulfide, or both, and/or the monoalkyl and/or dialkyl tin carboxylate, as the case may be, when present, are in admixture with the one or more thioglycolates of formula (2). By "admixture" is meant any combination regardless of whether the components are present as an exclusively physical mixture devoid of chemical (i.e. covalent or ionic) bonding therebetween, or are completely chemically bonded (i.e. covalently and/or ionically) amongst each other, or exist partially as a physical mixture and partially as chemically bonded species. The determining criterion is simply whether the various moieties correspond to the empirical formulas and relationships set forth herein.

Dialkyltin sulfides can be represented by the formula $(R^1)_2SnS$. Dialkyltin carboxylates can be represented by the formula $(R^1)_2Sn(OOCR^2)_2$. Monoalkyltin sulfides can be represented by the formula $(R^1Sn)_2S^3$. Monoalkyltin carboxylates can be represented by the formula $(R^1)Sn(OOCR^2)_3$. In these formulas each occurrence of $R^1$ is as defined above.

In blends including one or more thioglycolates of formula (2) and a dialkyltin sulfide and/or monoalkyltin sulfide, the ratio of equivalents of thioglycolate to equivalents of sulfide can range from 4:1 to 1:2, preferably from 2:1 to 1:1. In blends including one or more thioglycolates and a dialkyltin carboxylate and/or monoalkyltin carboxylate, the ratio of equivalents of thioglycolate to equivalents of carboxylate can range from 19:1 to 1:2, preferably from 2:1 to 1:1.

Such blends can be prepared by blending the individual components prepared by conventional methods. It is frequently convenient to prepare the components of a blend simultaneously in the same reaction vessel starting from a mixture of alkyltin precursors, which are usually alkyltin halides such as dialkyltin dihalides and monoalkyltin trihalides.

In general, compounds of the formula (2) can be prepared by reacting monoalkyltin trihalide and/or dialkyl tin dihalide, in the presence of water with an alkaline solution such as ammonium hydroxide, potassium hydroxide, or sodium hydroxide solution, and reacting this intermediate mixture with the alkyl thioglycolate, recovering the product as a hydrophobic liquid phase separating from an aqueous brine phase in a decanting vessel such as a separatory funnel, and stripping and filtering undesirable side products.

Similarly, a blend including one or more thioglycolates and a monoalkyltin sulfide and/or dialkyltin sulfide can be prepared by reacting monoalkyltin trihalide and/or dialkyltin dihalide in the presence of water with an alkaline solution such as ammonium hydroxide, potassium hydroxide, or sodium hydroxide solution, and reacting this intermediate mixture with an amount of the alkyl thioglycolate less than sufficient to convert all the monoalkyltin trihalide and/or dialkyltin dihalide charged and then adding a solution of a sulfide such as sodium sulfide in water to convert remaining monoalkyltin trihalide and/or dialkyltin dihalide to monoalkyltin sulfide and/or dialkyltin sulfide, and recovering the product as a hydrophobic liquid phase separating from an aqueous brine phase in a decanting vessel such as a separatory funnel. A blend including one or more thioglycolates and a monoalkyltin and/or dialkyltin carboxylate can be prepared by reacting monoalkyltin trihalide and/or dialkyltin dihalide in the presence of water with an alkaline solution such as ammonium hydroxide, potassium hydroxide, or sodium hydroxide solution, and reacting this intermediate mixture with an amount of the alkyl thioglycolate less than sufficient to convert all the monoalkyltin trihalide and/or dialkyltin dihalide charged, and adding a carboxylic acid and additional alkaline solution as required to convert remaining monoalkyltin trihalide and/or dialkyltin dihalide to monoalkyltin and/or dialkyltin carboxylate, recovering the product as a hydrophobic liquid phase separating from an aqueous brine phase in a decanting vessel such as a separatory funnel.

While the desired final liquid stabilizer component can be formed by mixing this product with the aromatic ether alcohol of formula (1), it is preferred to incorporate the aromatic ether alcohol of formula (1) during the synthesis of the thioglycolate or thioglycolate/sulfide admixture. Preferably, the liquid stabilizer composition of the present invention is made by adding the aromatic ether alcohol at the point after the alkyl tin halide and alkyl thioglycolate components have been added to the alkaline solution.

In the component of the formula (1)

$$\text{Ar}-\text{O}-(\text{CH}_2\text{CH(X)O})_n\text{H} \qquad (1)$$

the group Ar can be a monocyclic or bicyclic aryl group containing 6 to 10 carbons atoms. Preferably, Ar is phenyl. This compound of formula (1) contains 1 to 5 repeating alkoxy units, and preferably 1 to 2 repeating alkoxy units. As can be seen, each occurrence of the substituent X can be hydrogen or methyl, although it is preferred that each occurrence of the substituent X in a given compound is the same. The compound of the formula (1) should be water-insoluble, by which is meant that it exhibits a solubility of less than 3 grams per 100 milliliters of water.

Compounds of formula (1) can be synthesized in a straightforward manner by reaction of the corresponding aryloxy precursor, e.g. phenol, and alkylene oxide such as ethylene oxide or propylene oxide whereby the aryl group is attached to one end thereof. Compounds of the formula (1) which exhibit satisfactory performance in the compositions of the present invention are also commercially available. For instance, ethylene glycol phenyl ether (having the formula $C_6H_5OC_2H_4OH$) and propylene glycol phenyl ether (also termed 1-phenoxy-2-propanol, having the formula $C_6H_5OC_3H_6OH$) are commercially available as, respectively, "Dowanol EPh" and "Dowanol PPh" from Dow Chemical Company.

Preferably, the one or more thioglycolates of the formula (2) and the one or more aromatic ether alcohols of the formula (1) are present in the liquid stabilizer composition in amounts such that the ratio by weight of thioglycolate(s) to aromatic ether alcohol(s) is from 99:1 to 4:1 and preferably from 30:1 to 7:1.

Satisfactory ratios of aromatic ether alcohol(s) to thioglycolate(s) in the composition can be ascertained for any particular formula of the alcohol(s) and thioglycolate(s) being employed, by formulating a given composition and assessing its storability, that is, its tendency to form precipitates upon standing for a given length of time at a specified temperature.

Without intending to be bound by any particular explanation of the operation of the invention, the invention has been observed to exhibit behavior consistent with the proposition that since the aromatic ether alcohol is essentially water insoluble, this insolubility assists in retaining the thioglycolate component in the stabilizer product. This behavior retains the full stabilization capability of the thioglycolate and simultaneously avoids contamination of waste water streams generated during the synthesis of the thioglycolate. In addition, the aromatic ether alcohol appears to contribute uniformity to the organic phase that is formed, while solubilizing the various species of the stabilizer composition to form a homogeneous liquid product. The aromatic ether alcohol also reduces the water content in the organic phase, thus effectively reducing the time and the severity of the conditions (e.g. temperature) necessary to dry (e.g. remove water from) the product. Being able to dry the product without having to raise its temperature unduly has the beneficial effect of reducing the extent of hydrolysis of esters present. Also, notably, the aromatic ether alcohol contributes long term shelf stability to the liquid stabilizer product.

Synthesis of the liquid stabilizer composition in accordance with the present invention exhibits rapid phase separation, thereby facilitating synthesis and minimizing the need to remove entrained water. Thus, the organic (lower) phase formed in the synthesis generally contains a surprisingly reduced amount of water on the order of 1 to 3.5%, or less.

The liquid stabilizer compositions of the present invention are preferably used to advantage in combination with vinyl halide resins, preferably polyvinyl chloride resins. The term "polyvinyl chloride" as used herein is inclusive of any polymer formed at least in part of the recurring group (—CHCl—$CX_2$—)$_p$ and having a chlorine content in excess of 40%. In this formula, each of the X groups can be either hydrogen or chlorine, and p is the number of units in each polymer chain. In polyvinyl chloride homopolymers, each of the X groups is hydrogen. Thus, the terms "PVC" and "polyvinyl chloride" include not only polyvinyl chloride homopolymers but also after—chlorinated polyvinyl chlorides, as well as copolymers of vinyl chloride in a major proportion with other copolymerizable monomers in moderate proportion such as copolymers of vinyl chloride and vinyl acetate, copolymers of vinyl chloride with maleic or fumaric acids or esters, and copolymers of vinyl chloride with styrene. The stabilizer compositions are effective also with mixtures of polyvinyl chloride in major proportion with a minor proportion of other synthetic resins such as chlorinated polyethylene or copolymers of acrylonitrile, butylene and styrene.

Stabilizer compositions of the present invention can be used with plasticized polyvinyl chloride resin compositions of conventional formulation. Conventional plasticizers well known to those skilled in the art can be employed such as, for example, dioctyl phthalate, octyl diphenylphospate, and epoxidized soybean oil. Particularly useful plasticizers are the epoxidized esters having from 20 to 150 carbon atoms.

The stabilizer compositions of the present invention are used in small but effective amounts to impart heat stability, that is, enhanced resistance to heat-mediated deterioration of the PVC or other polyvinyl chloride resin. That is, "heat-mediated deterioration" includes deterioration which is due to exposure to excessive heat, as well as deterioration which is initiated or accelerated by exposure to heat. Effective heat stability is afforded generally by adding about 0.5 to about 5 phr (parts by weight per hundred parts by weight of resin) of the stabilizer composition. Preferred amounts of the stabilizer are generally in the range of about 1 to about 4 phr. The liquid stabilizer can be compounded into the resin formulation in accordance with conventional compounding techniques abundantly familiar to one of ordinary skill in this art.

The stabilized polyvinyl chloride resin composition comprising these components can also contain conventional additional additives such as antioxidants, lubricity agents, flame retardants, fillers, pigments, and the like, in relative amounts effective to fulfill the desired functions of each such ingredient. These ingredients can be added, if desired, prior to, during, or subsequent to the step in which the heat stabilizer composition of the present invention is compounded into the polyvinyl chloride composition.

Liquid stabilizer compositions prepared in accordance with the teachings of the present invention have been found to exhibit little or no precipitation upon standing at ambient temperature for a year or longer.

In addition, polyvinyl chloride formulations prepared with the liquid stabilizer compositions of the present invention have been found to exhibit not only notable heat stability, but also superior whiteness color hold, and long-term dynamic stability.

The invention will be described further in the following examples, which are intended for illustration and should not be deemed limiting of the scope of the present invention.

EXAMPLE 1

Into a 2-liter beaker were charged 154.2 g of a 75:25 (weight) mixture of monomethyl tin trichloride and dimethyl tin dichloride, an additional 36.4 g of dimethyl tin dichloride (the aggregate thus corresponding to a monomethyl:dimethyl ratio of 60:40) and 200.0 grams of water.

Then, 265.9 grams of a 20 wt. % sodium hydroxide solution (1.329 moles NaOH) was added at 60°–65° C. followed by 274.5 grams (1.329 moles) of 2-ethylhexyl thioglycolate (99%). This mixture was agitated for 30 minutes, following which 27.5 grams of "Dowanol PPh" propylene glycol phenyl ether was added, followed by a solution of 51.8 grams (0.3988 moles) of $Na_2S$ (60%) in 200 grams of water. The final aliquot was added carefully to a final pH of 7.0. The mixture was transferred to a separatory funnel and allowed to settle for 1–2 hours. The liquid stabilizer formed as a liquid product beneath the aqueous phase in the separatory funnel. It was recovered from the funnel and was found to weigh 431.0 grams. This product was transferred to a 3-neck flask and stripped (of water) at 20 mm pressure and 105° C. The weight of the product remaining after the stripping step was 423.1 grams. This corresponds to a moisture content of 1.9% in the product prior to stripping. The stripped product was filtered through a celluosic filter medium and the final product weighed 406.4 grams.

The tin and sulfur contents of this product, based on the reactants, were 23.1% tin, 10.4% mercaptan sulfur, and 3.0% sulfide sulfur (i.e. on an equivalents basis, a ratio of SH:S of about 1.66:1).

EXAMPLE 2

The procedure employed in Example 1 was carried out with 129.6 grams of a 75:25 (weight) mixture of monomethyltin trichloride and dimethyl tin dichloride, an additional 67.1 grams of dimethyl tin dichloride (bringing the aggregate monomethyl:dimethyl ratio to 50:50), and 200.0 grams of water, followed by 212.7 grams (1.0635 moles) of sodium hydroxide (20% solution), 219.6 grams (1.0635 moles) of 2-ethylhexyl thioglycolate, 27.5 grams of propylene glycol phenyl ether, and a solution of 69.1 grams (0.5318 moles) of Na$_2$S in 300.0 grams of water.

The weight of the recovered product was 384.0 grams; the weight following the stripping of water was 377.0 grams. This corresponded to a moisture content of 1.9% in the product before stripping. The final product obtained after filtration weighed 356.7 grams.

The tin and sulfur contents of this product, based on the amounts of the reactants, were 26.9% tin, 9.3% mercaptan sulfur, and 4.5% sulfide sulfur (i.e. on an equivalents basis, a ratio of SH:S of about 1:1).

EXAMPLES 3–8

Additional compositions containing alkyl tin thioglycolate, methyl tin sulfides, and 4.0–5.0% propylene glycol phenyl ether, were made using procedures similar to that in Example 1. The compositions, the contents based on reactant amounts, and the moisture content after settling 1–2 hours (before stripping of water) were as follows:

| Ex. | Monomethyl: Dimethyl ratio | SH:S (equiv.) | Sn% | SH% | S% | Moisture content (1–2 hrs.) |
|---|---|---|---|---|---|---|
| 3 | 75:25 | 1.66:1 | 22.3 | 10.6 | 3.1 | 1.8 |
| 4 | 50:50 | 1.66:1 | 23.7 | 10.3 | 3.0 | 1.8 |
| 5 | 40:60 | 1.66:1 | 24.3 | 10.1 | 2.95 | 3.4 |
| 6 | 75:25 | 1:1 | 25.4 | 9.6 | 4.7 | 2.4 |
| 7 | 60:40 | 1:1 | 26.4 | 9.5 | 4.6 | 1.0 |
| 8 | 40:60 | 1:1 | 27.5 | 9.1 | 4.4 | 1.7 |

Synthesis of these or similar stabilizers, but omitting any aryl ether alcohol, has been found to result in products containing 5–10% moisture.

EXAMPLES 9–12

The stability against precipitate formation of various compositions was evaluated by accelerated aging tests carried out at 140°–150° F. The results are set forth in the following table:

| Ex. | Stabilizer composition | Observation |
|---|---|---|
| 9 | Dimethyltin bis(2-ethylhexyl thioglycolate)(80 ± 2%)/ | |
| | (A) wihtout additive | Precipitate after 7 days |
| | (B) with 5% propylene glycol phenyl ether | Clear without precipitate after 3 weeks |
| 10 | Monomethyltin tris (2-ethylhexyl thioglycolate)/dimethyltin bis (2-ethylhexyl thioglycolate)/ monomethyl tin sulfide/dimethyl tin sulfide (approx. 3:1 (wt.) monomethyltin: dimethyltin and 1:1 (equivs.) 2-ethylhexyl thioglycolate:sulfide) | |
| | (A) without additive | Precipitate after 3 months |
| | (B) with approx. 7% propylene glycol phenyl ether | Clear without precipitate after 3 months |
| 11 | Dibutyl tin bis(2-ethylhexyl thioglycolate) | |
| | (A) without additive | Precipitate after 7 days |
| | (B) with 5% propylene glycol phenyl ether | Clear without precipitate after 3 weeks |
| 12 | Dibutyl tin bis(2-ethylhexyl thioglycolate) (50%)/dibutyl tin dilaurate (50%) | |
| | (A) without additive | Precipitate after 2 weeks |
| | (B) with 2/5% propylene glycol phenyl ether | Precipitate after 12 days |

These results demonstrate that the presence of the aryl ether alcohol in the stabilizer compositions substantially reduces the tendency of the composition to form precipitates.

EXAMPLES 13

PVC formulations containing various stabilizers were made in accordance with the following compositions, and were tested for color stability in a "dynamic Brabender" procedure wherein the PVC formulation was heated in a continuous mixer and torque rheometer and periodically sampled to monitor color changes and melt viscosity.

| Siding Formulation | |
|---|---|
| PVC homopoylmer ("Geon 27", Geon Corp.) | 100.0 (all in parts by wt.) |
| Acrylic copolymer processing aids | |
| ("K-125", Rohm & Haas) | 0.4 |
| ("K-175", Rohm & Haas) | 1.0 |
| Acrylic polymer blend, impact modifier ("KM-334", Rohm & Haas) | 7.0 |
| Calcium stearate | 1.2 |
| Paraffin wax (m.p. approx. 165° F.) | 1.0 |
| Titanium dioxide | 10.0 |
| Stabilizer | 1.5 |
| Clear PVC Formulation | |
| PVC homopolymer ("OXY 225", Oxy Chemical Corp.) | 100.0 |
| Diisooctyl phthalate | 5.0 |
| Acrylic copolymer processing aid ("K-120N", Rohm & Haas) | 1.5 |
| Oxidized polyethylene ("AC 629A", Allied-Signal) | 0.2 |
| Stabilizer | 1.5 |

Samples of the siding and clear formulations containing, in turn, each of the stabilizers described in Examples 1, 2, 4, 5, 7 and 8 were found to be equivalent or superior to the formulations containing different stabilizers (not containing the aryl ether alcohols) in whiteness, color hold and long-term dynamic stability. Thus, it can be seen that the compositions of the present invention are effective stabilizers in addition to their virtues in exhibiting a reduced tendency to form precipitate on standing.

What is claimed is:

1. A liquid stabilizer composition for vinyl halide compositions, which exhibits a reduced tendency to form precipitate on standing, comprising (a) a water-insoluble aromatic ether alcohol of the formula $$Ar-O-(CH_2CH(X)O)_nH \quad (1)$$

wherein Ar is aryl containing 6 to 10 carbon atoms,

X independently at each occurrence is —H or —CH$_3$; and n is 1 to 5; provided that when X at each occurrence is —H, then n is 1; and (b) one or more thioglycolates of the formula (2)

$$(R^1)_aSn(-SCH_2COOR^2)_{4-a} \quad (2)$$

wherein R$^1$ independently at each occurrence is straight or branched alkyl containing 1 to 4 carbon atoms;

a is 1 to 2;

R$^2$ independently at each occurrence is straight or branched alkyl containing 7 to 16 carbon atoms; optionally admixed with one or more compounds selected from the group consisting of monoalkyl tin sulfides, dialkyl tin sulfides, monoalkyl tin carboxylates and dialkyl tin carboxylates, in which group each alkyl substituent is independently straight or branched alkyl containing 1 to 4 carbon atoms.

2. A composition according to claim 1 wherein said component (a) is present in an amount, relative to the amount of said component (b), effective to increase the storage stability of said composition.

3. A composition according to claim 1 wherein the ratio by weight of component (b) to component (a) is 99:1 to 4:1.

4. A composition according to claim 1 wherein Ar is phenyl.

5. A composition according to claim 4 wherein n is 1 and X is —CH$_3$.

6. A composition according to claim 1 comprising one or both of monoalkyl tin sulfide and dialkyl tin sulfide.

7. A composition according to claim 6 wherein said component (a) is present in an amount, relative to the amount of said component (b), effective to increase the storage stability of said composition.

8. A composition according to claim 6 wherein the ratio by weight of component (b) to component (a) is 99:1 to 4:1.

9. A composition according to claim 6 wherein Ar is phenyl.

10. A composition according to claim 9 wherein n is 1 and X is —CH$_3$.

11. A composition of matter comprising a vinyl halide polymer and a stabilizer composition according to claim 1 in an amount thereof effective to impart to the composition increased stability against heat-mediated degradation of the polymer.

12. A composition according to claim 11 wherein the ratio by weight of component (b) to component (a) is 99:1 to 4:1.

13. A composition of matter according to claim 11 wherein the polymer is a homopolymer of vinyl chloride.

14. A composition of matter according to claim 11 wherein the polymer is a copolymer of vinyl chloride.

15. A composition of matter according to claim 11 wherein Ar is phenyl.

16. A composition of matter according to claim 11 wherein n is 1 and X is —CH$_3$.

17. A composition of matter comprising a vinyl halide polymer and a stabilizer composition according to claim 6 in an amount thereof effective to impart to the composition increased stability against heat-mediated degradation of the polymer.

18. A composition according to claim 17 wherein the ratio by weight of component (b) to component (a) is 99:1 to 4:1.

19. A composition of matter according to claim 17 wherein the polymer is a homopolymer of vinyl chloride.

20. A composition of matter according to claim 17 wherein the polymer is a copolymer of vinyl chloride.

21. A composition of matter according to claim 17 wherein Ar is phenyl.

22. A composition of matter according to claim 17 wherein n is 1 and X is —CH$_3$.

23. A method of reducing the tendency of a liquid stabilizer composition for vinyl halide compositions to form precipitate on standing, wherein said liquid stabilizer composition comprises one or more thioglycolates of the formula (2)

$$(R^1)_aSn(-SCH_2COOR^2)_{4-a} \quad (2)$$

wherein R$^1$ independently at each occurrence is straight or branched alkyl containing 1 to 4 carbon atoms;

a is 1 to 2;

R$^2$ independently at each occurrence is straight or branched alkyl containing 7 to 16 carbon atoms; optionally admixed with one or more compounds selected from the group consisting of monoalkyl tin sulfides, dialkyl tin sulfides, monoalkyl tin carboxylates and dialkyl tin carboxylates, in which group each alkyl substituent is independently straight or branched alkyl containing 1 to 4 carbon atoms, wherein the method comprises adding to said liquid stabilizer composition, during or after synthesis thereof, one or more water-insoluble aromatic ether alcohols of the formula (1)

$$Ar-O-(CH_2CH(X)O)_nH \quad (1)$$

wherein Ar is aryl containing 6 to 10 carbon atoms, X independently at each occurrence is —H or —CH$_3$, and n is 1 to 5, provided that when X at each occurrence is —H, then n is 1; in an amount effective to reduce the tendency of said composition to form precipitate on standing.

24. A method according to claim 23 wherein Ar is phenyl.

25. A method according to claim 24 wherein n is 1 and X is —CH$_3$.

26. A method according to claim 23 wherein the ratio by weight of said one or more compounds of formula (2) to said one or more compounds of formula (1) is 99:1 to 4:1.

27. A method according to claim 23 wherein said liquid stabilizer composition comprises one or both of monoalkyl tin sulfide and dialkyl tin sulfide.

28. A method according to claim 27 wherein Ar is phenyl.

29. A method according to claim 28 wherein n is 1 and X is —CH$_3$.

30. A method according to claim 27 wherein the ratio by weight of said one or more compounds of formula (2) to said one or more compounds of formula (1) is 99:1 to 4:1.

* * * * *

UNITED STATES PATENT AND TRADEMARK OFFICE
CERTIFICATE OF CORRECTION

PATENT NO. : 5,527,842
DATED : June 18, 1996
INVENTOR(S) : Samuel Hoch

It is certified that error appears in the above-indentified patent and that said Letters Patent is hereby corrected as shown below:

Column 7, lines 51-52: after "(80 ± 2%)/" insert --Monomethyltin tris (2-ethylhexyl thioglycolate) (20 ± 2%)--

Column 7, line 52: "wihtout" should read --without--

Column 8, line 15: "2/5" should read --2.5--

Column 8, line 16: "12" should read --32--

Signed and Sealed this

Twenty-fifth Day of March, 1997

Attest:

BRUCE LEHMAN

*Attesting Officer*  *Commissioner of Patents and Trademarks*